United States Patent
Wen et al.

(10) Patent No.: US 12,481,631 B2
(45) Date of Patent: Nov. 25, 2025

(54) INFORMATION SEGMENTATION METHODS, APPARATUSES, AND ELECTRONIC DEVICES

(71) Applicant: LEMON INC., Grand Cayman (KY)

(72) Inventors: Longyin Wen, Los Angeles, CA (US); Xinyao Wang, Los Angeles, CA (US); Dexiang Hong, Beijing (CN); Congcong Li, Beijing (CN)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 18/572,606

(22) PCT Filed: Jun. 21, 2022

(86) PCT No.: PCT/SG2022/050427
§ 371 (c)(1),
(2) Date: Dec. 20, 2023

(87) PCT Pub. No.: WO2022/271100
PCT Pub. Date: Dec. 29, 2022

(65) Prior Publication Data
US 2024/0289312 A1    Aug. 29, 2024

(30) Foreign Application Priority Data
Jun. 25, 2021    (CN) .......................... 202110716045.9

(51) Int. Cl.
G06F 16/30    (2019.01)
G06F 16/22    (2019.01)
(52) U.S. Cl.
CPC ................................ G06F 16/2228 (2019.01)
(58) Field of Classification Search
CPC .................................................. G06F 16/2228
See application file for complete search history.

(56) References Cited

U.S. PATENT DOCUMENTS 11,776,273 B1 * 10/2023 Chen .................... G06N 3/0464
382/224
11,869,240 B1 * 1/2024 Patluri .................. G06V 20/46
(Continued)

FOREIGN PATENT DOCUMENTS

CN    102547139    4/2012
CN    110941594    3/2020

OTHER PUBLICATIONS

ISR for PCT application PCT/SG2022-050427 dated Jan. 3, 2023 (9 pages).

*Primary Examiner* — Khanh B Pham
(74) *Attorney, Agent, or Firm* — Astute IP Law Group

(57) ABSTRACT

Methods, apparatuses and electronic devices for information segmentation. The method includes, for a target information node in an information sequence and based on first node information of the target information node, determine a first demarcation point probability value, in which the first demarcation point probability value indicates a probability that the target information node is a first type of demarcation point; determine, based on the first demarcation point probability value and second node information of the target information node, a second demarcation point probability value, in which the second demarcation point probability value indicates a probability that the information node is a second type of demarcation point, and the first type of demarcation point is associated with the second type of demarcation point; and determines, based on the first and the second demarcation point probability value, at least two segmentation modes for the information sequence.

19 Claims, 9 Drawing Sheets

(56) References Cited

U.S. PATENT DOCUMENTS

| | | |
|---|---|---|
| 2016/0365121 A1 | 12/2016 | DeCaprio |
| 2019/0147105 A1* | 5/2019 | Chu ................. G06F 18/24143 386/241 |
| 2020/0401808 A1 | 12/2020 | Wu et al. |
| 2022/0067386 A1* | 3/2022 | Rotman ................... G06N 3/08 |
| 2022/0292830 A1* | 9/2022 | Shin ........................ G10L 25/57 |
| 2022/0301313 A1* | 9/2022 | Shin ........................ G10L 25/57 |
| 2022/0375225 A1* | 11/2022 | Zeng ..................... G06V 20/49 |
| 2023/0043769 A1* | 2/2023 | Walker ................ G06F 3/04847 |

* cited by examiner

INFORMATION SEGMENTATION METHODS, APPARATUSES, AND ELECTRONIC DEVICES

CROSS REFERENCE TO RELATED APPLICATIONS

This application claims the priority of the Chinese Patent Application No. 202110716045.9 filed on Jun. 25, 2021, entitled "INFORMATION SEGMENTATION METHODS, APPARATUSES, AND ELECTRONIC DEVICES", which is hereby incorporated by reference in its entirety.

TECHNICAL FIELD

The present disclosure relates to the technical field of the Internet, and in particular to information segmentation methods, apparatuses and electronic devices.

BACKGROUND

The goal of information segmentation algorithm is to cut raw data into data fragments of different granularity, which is the basis of various subsequent applications, such as editing, understanding, recognition, and so on.

SUMMARY

The summary section is provided to present the ideas in a brief form, which will be described in detail in the below description section. This summary section is not intended to identify the key or necessary features of the technical solution claimed, nor is it intended to limit the scope of the technical solution claimed.

In a first aspect, the embodiment of the present disclosure provides an information segmentation method, which includes: for a target information node in an information sequence and based on first node information of the target information node, determining a first demarcation point probability value, wherein the first demarcation point probability value indicates a probability that the target information node is a first type of demarcation point; determining, based on the first demarcation point probability value and second node information of the target information node, a second demarcation point probability value, wherein the second demarcation point probability value indicates a probability that the information node is a second type of demarcation point; and determining, based on the first demarcation point probability value and the second demarcation point probability value, at least two segmentation modes for the information sequence, wherein segmentation granularities of different segmentation modes are different.

In a second aspect, the present embodiment provides an electronic device comprising: one or more processors; and a storage apparatus for storing one or more programs which when executed by the one or more processors, causing the one or more processors to perform the information segmentation method as described in the first aspect.

In a third aspect, the present embodiment provides a computer-readable medium having a computer program stored thereon, and the program, when executed by processors, performs the steps of the information segmentation method as described in the first aspect.

BRIEF DESCRIPTION OF DRAWINGS

In conjunction with the drawings and with reference to the following specific implementations, the above and other features, advantages and aspects of various embodiments of the present disclosure will become more apparent. Throughout the drawings, identical or similar reference numbers indicate identical or similar elements. It should be understood that the drawings are schematic and that the components and elements are not necessarily drawn to scale.

DETAILED DESCRIPTIONS

Embodiments of the present disclosure are described in more detail with reference to the drawings below. Although certain embodiments of the present disclosure are shown in the accompanying drawings, it should be understood that the present disclosure may be implemented in various forms and should not be interpreted as limited to the embodiments set forth herein. Instead, these embodiments are provided for a more thorough and complete understanding of the present disclosure. It should be understood that the drawings and embodiments of the present disclosure are for illustrative purposes only and are not intended to limit the scope of protection of the disclosure.

It should be understood that the various steps described in the method implementations of the present disclosure may be performed in a different sequence and/or in parallel. In addition, the method implementations may include additional steps and/or omit the steps shown in the performance. The scope of this disclosure is not limited in this respect.

The term "including" as used herein and its variants are openly inclusive, i.e., "including but not limited to." The term "based" is "based at least in part." The term "one embodiment" means "at least one embodiment"; the term "another embodiment" means "at least one additional embodiment"; the term "some embodiments" means "at least some embodiments". Relevant definitions of other terms are given in the description below.

It should be noted that references to "first", "second" and other concepts in this disclosure are used only to distinguish between different apparatuses, modules or units and are not used to define the sequence or interdependence of functions performed by such apparatuses, modules or units.

It should be note that references to the modifications of "one" and "multiple" in this disclosure are indicative rather than restrictive and should be understood by those skilled in the art to mean "one or more" unless expressly stated otherwise in the context.

The names of messages or information interacted among multiple apparatuses in implementations of this disclosure are used only for illustrative purposes and are not intended to limit the scope of such messages or information.

Figure 1:
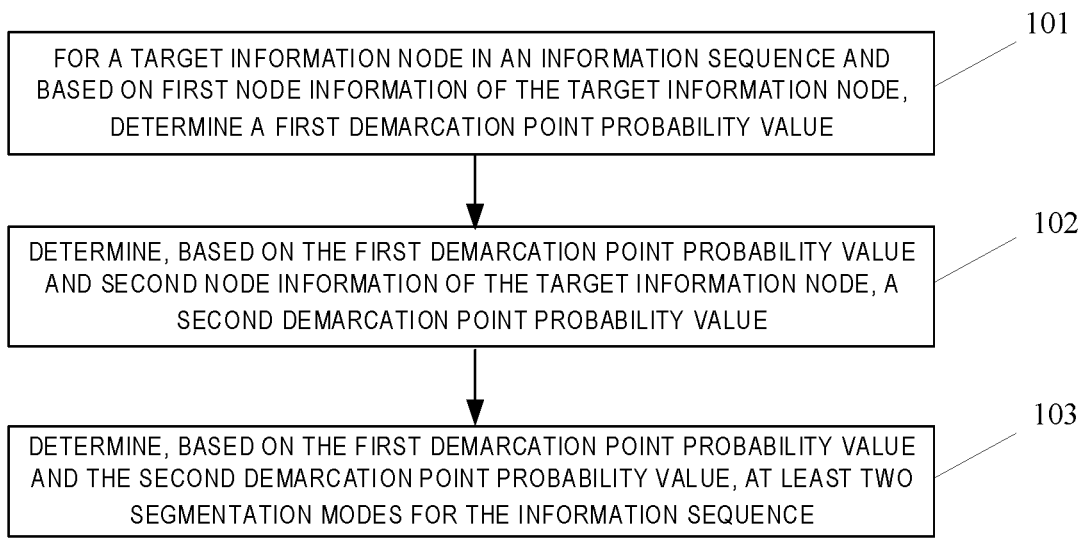
FIG. 1 is a flow chart of one embodiment of an information segmentation method according to the present disclosure.

Please refer to FIG. 1, which illustrates the flow of one embodiment of an information segmentation method according to the present disclosure. That information segmentation method is applied to a terminal device or server. The information segmentation method, as shown in FIG. 1, including the following steps:

In step 101, for a target information node in an information sequence and based on first node information of the target information node, a first demarcation point probability value is determined.

In this embodiment, the performing entity (for example, the server) of the information segmentation method may determine, for a target information node in an information sequence and based on first node information of the target information node, a first demarcation point probability value.

The information sequence herein may be a sequence composed of information. The types of the information may include, but are not limited to, at least one of image, text, audio.

The types of the information sequence herein are not limited. As an example, the information sequence may include at least one of the following but is not limited to video sequence, text sequence, etc.

The target information node herein can be any information unit or any position in the information sequence. The target in the target information node, added for ease of explanation, is not a limitation to information units.

In some application scenarios, the information sequence can be a video frame sequence, time points at the joints of video frames can be used as information nodes. one video frame can be used as an information node, and a preset number (for example, 3) of video frames can also be used as an information node.

In this application, as an example, the video frame sequence is taken as an example to illustrate. The target information node can be any video frame or time point in the video frame sequence.

The first node information of the target information node herein can be node feature information of the target information node. The first node information is used to determine the first demarcation point probability value.

The first demarcation point probability value herein indicates a probability that the target information node is a first type of demarcation point.

In some embodiments, for a target video frame in a video frame sequence, corresponding features can be extracted for a plurality of frames before and after the target video frame respectively. As an example, for the target video frame t in a video, the features of a total number of 2K frames within the time range of [t−K, t+K) are extracted; that is, the K consecutive frames before the target video frame and the K−1 consecutive frames after the target video frame can be extracted. The first node information can be determined based on the extracted features of the 2K frames.

In some embodiments, the features of 2K frames can be extracted using Channel-Separated Convolution Networks (CSNs).

In step 102, based on the first demarcation point probability value and second node information of the target information node, a second demarcation point probability value is determined.

The second demarcation point probability value herein can be used to characterize a probability that the target information node is a second type of demarcation point.

In some application scenarios, a probability of the first type of demarcation point appearing in the information sequence is higher than that of the second type of demarcation point.

The first type of demarcation point and the second type of demarcation point are associated with each other herein.

In some application scenarios, the first type of demarcation point and the second type of demarcation point have associated relationship. As an example, if an information node is the second type of demarcation point, that information node is also the first type of demarcation point usually.

As an example, for a video frame sequence, whether a video frame is an event demarcation point or not will have a direct impact on whether that video frame is a shot demarcation point. If the video frame is the event demarcation point, that video frame may be the shot demarcation point; and if the video frame is not the event demarcation point, a probability that the video frame is the shot demarcation point is low.

In step 103, based on the first demarcation point probability value and the second demarcation point probability value, at least two segmentation modes for the information sequence are determined.

Segmentation granularities of different segmentation modes are different herein. Different segmentation granularities can include different lengths of segmented fragments of the information sequence. In general, the number of the second type of demarcation points is not greater than the number of the first type of demarcation points.

As an example, the length of the fragments of information sequence obtained by segmenting at the first type of demarcation point of the information sequence may be shorter than that obtained by segmenting at the second type of demarcation point of the information sequence.

Step 103 herein may include that whether the target information node is the first type of demarcation point can be determined by using the first demarcation point probability value of the target information node; and whether the target information node is the second type of demarcation point can be determined by using the second demarcation point probability value of the target information node.

In some application scenarios, the method shown in FIG. 1 is used to process each information node in the information sequence, and a first demarcation point probability value and a second demarcation point probability value corresponding to each information node can be obtained. Then, by taking the first demarcation point probability value and the second demarcation point of each information node into account, the first type of demarcation points and the second type of demarcation points in the information sequence can be determined.

In some application scenarios, segmenting at the first type of demarcation point can be understood as a first segmentation mode. The segmentation at the second type of demarcation point can be understood as a second segmentation mode.

In some embodiments, the steps in this embodiment can be implemented using a trained neural network.

It should be noted that the information segmentation method provided in the present embodiment determines, for a target information node in an information sequence and based on first node information of the target information node, a first demarcation point probability value; and then determines, based on the first demarcation point probability value and second node information of the target information node, a second demarcation point probability value. The first demarcation point probability value can indicate a probability that the target information node is a first type of demarcation point, and the second demarcation point probability value can indicate a probability that the target information node is a second type of demarcation point. Then, it can be determined whether the target information node is determined as the first type of demarcation point and/or the second type of demarcation point in the information sequence, and thereby it can be determined whether the information sequence is segmented from the target information node. Thus, the accuracy of the second demarcation point probability value can be improved, and in turn, the accuracy for determination of the demarcation points can be improved to achieve accurate data segmentation. In addition, the segmentation modes corresponding to the at least two types of demarcation point can be obtained at the same time to realize the different granularities of hierarchical segmentation of information sequence.

In some application scenarios, events, shots and scenes can be divided from fine to coarse bases on the granularities of segmentation. The classification layer of the next level network receives the output of the previous level network and the features of the next level network itself. An event demarcation point is first predicted, and then a shot demarcation point is predicted based on the event demarcation point. Finally, a scene demarcation point is predicted based on the event demarcation point and the shot demarcation point.

As an example, the event can indicate the minimum video unit of cutoff. For example, the fragments, such as a complete action behavior, a continuous scene, etc., are video fragments with local continuous information.

As an example, the shot can indicate shooting content that is shot by a camera lens without interruption, which has visual consistency. That is, the shot transition demarcations in the video are detected.

As an example, the scene can indicate a semantic unit, which includes a series of semantically related shots or event fragments.

Optionally, the first type of demarcation point can be the event demarcation point, and the second type of demarcation point can be the shot demarcation point. Optionally, the first type of demarcation point can be the shot demarcation point and the second type of demarcation point can be the scene demarcation point. Optionally, the first type of demarcation point can be the event demarcation point and the second type of demarcation point can be the scene demarcation point.

Figure 2:
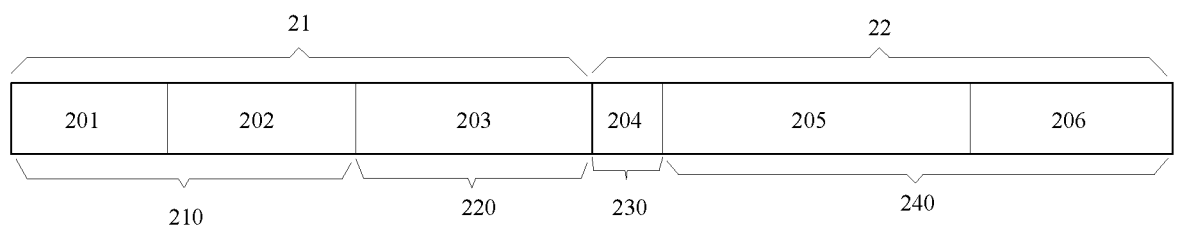
FIG. 2 is a scenario diagram of an information segmentation method according to the present disclosure.

Please refer to FIG. 2, which shows three segmentation modes in the video frame sequence. The demarcation point between a video fragment 201 and a video fragment 202 can be the first type of demarcation point. As an example, the first type of demarcation point can be the event demarcation point, and the video fragment 201 and the video fragment 202 can indicate relatively independent events.

A video fragment 210 can include the video fragment 201 and the video fragment 202. The demarcation point between the video fragment 210 and the video fragment 220 can be the second type of demarcation point. As an example, the second type of demarcation point can be the shot demarcation point. In other words, the video fragment 210 and the video fragment 220 can indicate separate shooting processes (before and after a shot transition).

A video fragment 21 can include the video fragment 210 and the video fragment 220. The demarcation point between the video fragment 21 and a video fragment 22 can be the third type of demarcation point. As an example, the third type of demarcation point could be the scene demarcation point. In other words, the video fragment 21 and the video fragment 22 can indicate relatively independent scenes.

As an example, the video fragment 201 may show person A entering a house. The video fragment 202 may show person A drinking water in a living room after entering the house. The video fragment 203 may show person A entering a kitchen and talking to person B. The video fragment 210 can be shot in the living room. The video fragment 220 can be shot in the kitchen, and the demarcation point between the video fragment shot in the living room and the video fragment shot in the kitchen can be the shot demarcation point.

As an example, a video fragment 204 can show person A and person B waiting for an elevator. A video fragment 205 can show person A and person B chatting in an elevator. A video fragment 206 can show person A and person B fighting in an elevator. A video fragment 230 could have been shot in the corridor, and the video fragment 240 could have been shot in the elevator. The demarcation point between the video fragment 230 and the video fragment 240 can be the shot demarcation point.

As an example, the video fragment 21 can show the scene inside the house. The video fragment 22 can show the scene outside the house.

In some embodiments, the method further includes: obtaining third node information of the target information node; the third demarcation point probability value is determined based on the third node information and at least one of the first demarcation point probability value and the second demarcation point probability value.

The third demarcation point probability value herein can be used to indicate a probability that whether the target information node is the third type of demarcation point.

In some embodiments, step 103 above may also include determining a segmentation mode corresponding to the third type of demarcation point.

In some application scenarios, the first type of demarcation point may be the event demarcation point. The second type of demarcation point may be the shot demarcation point. And the third type of demarcation point may be the scene demarcation point. The event demarcation point and the shot demarcation point are used as reference information to determine the scene demarcation point. The internal relation between the time demarcation point, the shot demarcation point and the scene demarcation point can be fully used and realized by technical means to determine more accurate scene demarcation points.

It should be noted that using the first demarcation point probability value and/or the second demarcation point probability value as reference information can refer to the judgment result of the demarcation point with smaller granularity than that of the third type of demarcation point as a prior event, to help judge whether the target information node is the third type of demarcation point, which can improve the accuracy of determining whether the target information node is the third type of demarcation point.

In some embodiments, the method may further have a plurality of segmentation modes, each corresponding to one type of demarcation point, and the determination of each demarcation point probability value is related to at least one other demarcation point probability value.

By way of example, the method may involve 4 types of demarcation points. Each type of demarcation point may correspond to a segmentation mode. The determination of the demarcation point probability value may be related to the probability values of the other types of demarcation points.

Therefore, hierarchical segmentation can be achieved regardless of the number of the types of demarcation point.

In some embodiments, the information sequence may include a video frame sequence. The first type of demarcation point may be an event demarcation point. The second type of demarcation point may be a shot demarcation point. The third type of demarcation point may be a scene demarcation point.

In some embodiments, the step 101 described above may comprise importing, into a first cascaded classifier, information of event advanced features for the target information node, wherein the first cascaded classifier comprises at least two first classifiers; generating the first demarcation point probability value based on confidences output by respective first classifiers in the first cascaded classifier. The advanced features herein comprise timing features and/or attention features.

A cascaded classifier herein can include a plurality of classifiers that are cascaded at the time of training. In general, the judgment severities of each level of the cascaded classifier are different. The plurality of classifiers can be independent of each other when processing the first node information. Each classifier in the cascaded classifier can output a confidence.

Each classifier in the first cascaded classifier herein can be referred to as the first classifier. The first classifier can be used to judge whether it is the first type of demarcation point.

Figure 3:
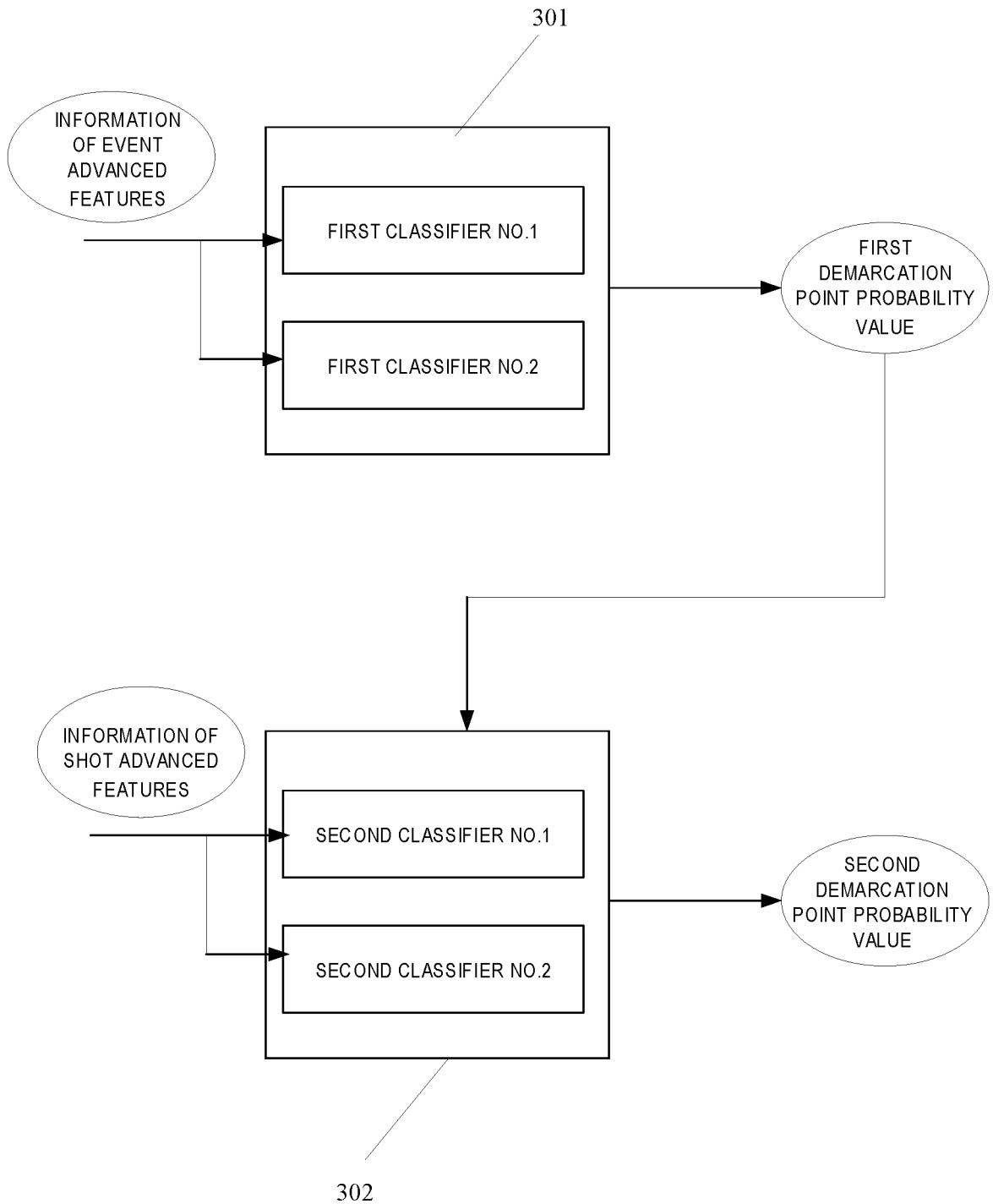
FIG. 3 is a scenario diagram of an information segmentation method according to the present disclosure.

Please refer to FIG. 3, the first node information can be input to a respective first classifier of the first cascaded classifier 301. Each of the first classifiers can output a confidence, in order to facilitate the distinction, the first classifiers in the first cascaded classifier can be distributed as a first classifier No. 1 and a first classifier No. 2. In FIG. 3, for the sake of simplicity of the schematic diagram, the first cascaded classifier is represented by two first classifiers, and the same is for other cascaded classifiers. Based on confidences output by the classifiers in the first cascaded classifier, the first demarcation point probability value can be obtained.

In some embodiments, the first demarcation point probability value may be generated in a variety of ways, including but not limited to at least one of averaging, weighted averaging, and taking the median.

It should be noted that using the cascaded classifier to process information of event advanced features can reduce false positive misidentification, realize the judgment from coarse to fine, and improve the accuracy of determining whether the target information node is the event demarcation point.

In some embodiments, the second cascaded classifier can include a plurality of second classifiers, as shown in FIG. 3. The second classifiers in the second cascaded classifier 302 (which are a second classifier No. 1 and a second classifier No. 2) can share information of shot advanced features, and each second classifier can output a confidence. According to the output confidences, a shot demarcation point probability value can be generated.

In some embodiments, the first classifiers in the first cascaded classifier correspond to event advanced feature extraction networks one by one.

In some embodiments, for a target information node in an information sequence and based on first node information of the target information node, the determining a first demarcation point probability value comprises: obtaining basic feature information of the target information node; importing the basic feature information into each of the event advanced feature extraction networks, to obtain the information of event advanced features; inputting respective ones of the information of event advanced features into the corresponding first classifiers, to obtain confidences output by the first classifiers; determining, based on confidences output by the respective first classifiers, the first demarcation point probability value.

The basic feature information herein comprises visual feature information and/or audio feature information.

Advanced features herein comprise timing features and/or attention features.

Figure 4:
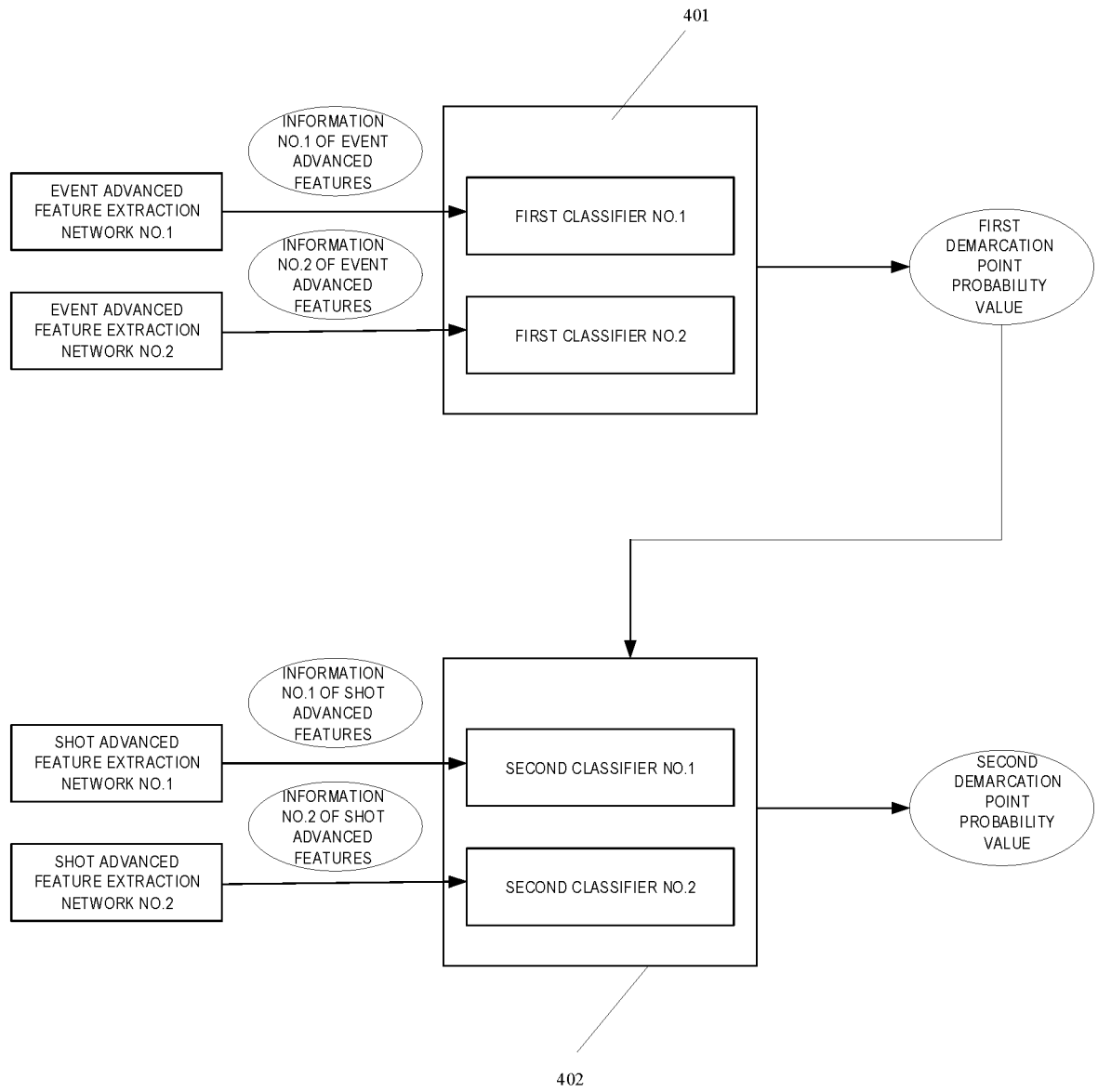
FIG. 4 is a scenario diagram of an information segmentation method according to the present disclosure.

Refer to FIG. 4, the first cascaded classifier 401 can include a plurality of first classifiers. Each classifier can have its own advanced feature extraction network. For example, an event advanced feature extraction network No. 1 can output information No. 1 of event advanced features to the first classifier No. 1 and an event advanced feature extraction network No. 2 can output information No. 2 of event advanced features to the first classifier No. 2.

Similarly, the second cascaded classifier 402 can include a plurality of second classifiers. Each classifier can have its own advanced feature extraction network. For example, a shot advanced feature extraction network No. 1 can output information No. 1 of shot advanced features to the second classifier No. 1 and a shot advanced feature extraction network No. 2 can output information No. 2 of shot advanced features to the second classifier No. 2.

In other words, the extraction networks can be shared between the first classifiers in the first cascaded classifier (see FIG. 3), or the respective classifier's own extraction network can be set up (see FIG. 4).

It should be noted that by using the extraction networks corresponding to the classifiers to extract the information of advanced features, the information of advanced features input into the respective classifier can be adapted to that classifier. Compared to the same input information for classifiers, different input information for the respective classifiers can increase the difference in the information output by the classifiers and improve the accuracy of the information output by the respective classifiers.

In some embodiments, the second cascaded classifier includes at least two second classifiers, and the second classifiers in the second cascaded classifier corresponds to shot advanced feature extraction networks one by one.

In some embodiments, the determining, based on the first demarcation point probability value and second node information of the target information node, a second demarcation point probability value comprises: importing the basic feature information into each of the shot advanced feature extraction networks, to obtain respective ones of information of shot advanced features; inputting the respective ones of information of shot advanced features and the first demarcation point probability value into the corresponding second classifier, to obtain confidences output by the second classifiers; and determining, based on confidences output by the respective second classifiers, the second demarcation point probability value.

As an example, the second cascaded classifier 402 can include a second classifier No. 1 and a second classifier No. 2. The second classifier No. 1 can correspond to the shot advanced feature extraction network No. 1, which can be used to extract the features of the target information node to obtain information No. 1 of shot advanced features. The first demarcation point probability value and the information No. 1 of shot advanced features output by the shot advanced feature extraction network No. 1 can be used as input to the second classifier No. 1, and the second classifier No. 1 can output a confidence.

As an example, the second classifier No. 2 can correspond to the shot advanced feature extraction network No. 2, which can be used to extract the features of the target information node to obtain information No. 2 of shot advanced features. The first demarcation point probability value and the information No. 2 of shot advanced features output by the shot advanced feature extraction network No. 2 can be used as input to the second classifier No. 2, and the second classifier No. 2 can output a confidence.

It should be noted that by inputting the first demarcation point probability value into the respective second classifies of the second cascaded classifier, the respective second classifiers can apply personalized processing to the first demarcation point probability, so that the first demarcation point probability plays different roles in different second classifiers, to adapt to the differential processing of the plurality of second classifiers in the classification of the same information node, and to cooperate with the second cascaded classifier to improve the accuracy of the second demarcation point probability value.

In some embodiments, a third cascaded classifier includes at least two third cascades, and the third classifiers in the third cascaded classifier corresponds to scene advanced feature extraction networks one by one.

The method herein further includes importing the basic feature information into each of the scene advanced feature extraction networks, to obtain respective ones of information of scene advanced features; inputting, into the corresponding third classifier, the respective ones of the information of scene advanced features and at least one of the first demarcation point probability value and the second demarcation point probability value, to obtain confidences output by the third classifiers; and determining, based on the confidences output by the respective third classifiers, the third demarcation point probability value, wherein the third demarcation point probability value indicates a probability that the target information node is the event demarcation point.

In some embodiments, sample feature information of training samples is obtained, wherein the training samples are information nodes in a sample information sequence; importing the sample feature information into a target classifier in the cascaded classifier, wherein respective classifiers in the cascaded classifier correspond to error labels one by one, and an error indicated by an error label of a classifier at a higher level than that of the target classifier is smaller than an error indicated by an error label of the target classifier; in accordance with a determination that an output result of the target classifier is true, using a classifier with a higher level than the target classifier to process the sample node information; and in accordance with a determination that the output result of the target classifier is false, masking the training sample.

It should be noted that the identification of demarcation points in the information sequence may be either black or white. For example, the demarcation points between events in a video may be difficult to represent by a single image frame. In some related techniques, error labels can be set in a way that specifically hedges the ambiguity of demarcation points. That is, a distance error is set. A positive sample label is labeled in the training samples for a certain frame (for example, the video frame in the middle of suspected demarcation point video frames) and then frames within the distance error threshold range of the positive sample are also labeled as the positive sample.

However, if the distance error is set relatively large, the positive samples in the training sample will include more ambiguous time boundaries with which the classifier is trained. This will cause the classifier to judge the demarcation point more coarsely, resulting in more false positives predicted (that is, the information nodes that are not a demarcation point is judged as a demarcation point). Conversely, if the distance error is set relatively small, there will be fewer positive samples in the training samples. In this case, the network including the classifier will be exposed to a smaller proportion of positive samples and cannot repeatedly learn the features of the positive samples that are demarcation points in the sequence.

In the face of the above technical problems, the inventor of this application comes up with setting up a cascaded classification structure. The cascaded classification structure can be realized by setting up a set of classifiers.

As an example, a set of classifiers can be denoted as $\{H_1, H_2, \ldots H_N\}$ and the output of each classifier can be labeled as $\{S_1, S_2, \ldots S_N\}$, where N can be the number of cascaded classifiers. For sequence samples, the 100th image frame can be set as a positive sample. Then, a series of error labels can be set, which is denoted as $\{u_1, u_2, \ldots u_N\}$, $u_1 \geq u_2 \geq \ldots \geq u_N$. Based on the respective error labels, it is possible to determine a series of sample labels for a training sample (e.g. the 105th frame in the sequence samples), which is denoted as $\{L_1, L_2, \ldots L_N\}$. That is, $u_1$ is equal to 10, and the training sample can be a positive sample; u2 is equal to 6, and the training sample can be a positive sample; but if $u_2$ is equal to 4, then the training sample is a negative sample.

As an example, during training process, $H_1$ processes the training sample, and if the resulting confidence of $S_1$ is not less than a confidence threshold corresponding to $H_1$, the training sample is imported into $H_2$ for processing. If the resulting confidence of $S_1$ is less than the confidence threshold corresponding to $H_1$, the training sample will be abandoned.

Therefore, there can be a higher proportion of positive samples in the samples that exposed to a higher-level classifier, which improves identification ability and precision of higher-level classifiers for positive samples.

In some application scenarios, the confidence threshold corresponding to the classifier is positively correlated with the level of the classifier. In other words, a higher level of classifier corresponds to a higher confidence threshold.

As an example, $L_1$ is a positive sample label, and $S_1$ is 90. The confidence threshold corresponding to $H_1$ can be 60, and then $H_2$ can be used to process the training sample. The resulting $S_2$ is 75, and if the confidence threshold corresponding to $H_2$ is 70, $H_3$ can be used to process the training sample; and if the confidence threshold corresponding to $H_2$ is 80, the training sample can be masked. It can be understood that if $L_2$ is a negative sample label but $S_2$ is 75 and the confidence threshold corresponding to $H_2$ is 70 (that is, it is identified as a positive sample), this identification error situation can be optimized in adjusting the network parameters, so that the identification result of $H_2$ for the training sample is consistent with the label $L_2$ corresponding to $H_2$.

In some embodiments, the method may further include obtaining, from a video frame sequence, a preset number of consecutive video frames before the target information node and a preset number of consecutive video frames after the target information node, to obtain a video frame sub-sequence; and importing, into a pre-trained basic feature extraction network, the video frame sub-sequence to obtain the basic feature information of the target information node.

As an example, for the target information node in the video frame sequence, the features of a total number of 2K frames within the time range of [t−K, t+K) can be extracted for time t in the video; that is, the K consecutive frames before the target video frame and the K consecutive frames after the target video frame can be extracted. Based on the extracted 2K frame features, the basic feature information can be determined. These 2K frames in the video frame sequence can be used as the video sub-sequence.

In some embodiments, the basic feature extraction network includes at least one of a visual feature extraction network and an audio feature extraction network.

Figure 5:
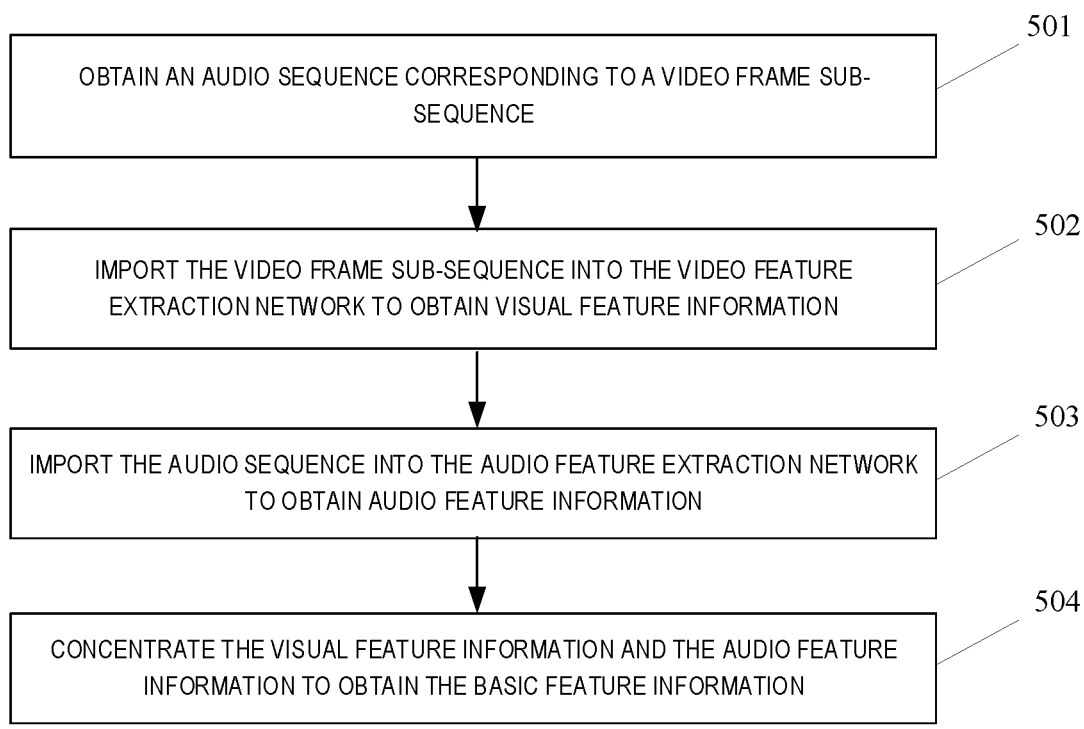
FIG. 5 is a schematic diagram of an implementation of an information segmentation method according to the present disclosure.

In some embodiments, the importing, into a basic feature extraction network, the video frame sub-sequence to obtain the basic feature information of the target information node is shown as the steps in FIG. 5.

In step 501, an audio sequence corresponding to a video frame sub-sequence is obtained.

In step 502, the video frame sub-sequence is imported into the video feature extraction network to obtain visual feature information.

In Step 503, the audio sequence is imported into the audio feature extraction network to obtain audio feature information.

In Step 504, the visual feature information and the audio feature information are concentrated to obtain the basic feature information.

The visual feature extraction network herein can be used to extract feature information of the video sub-sequence.

The audio feature extraction network herein can be used to extract audio information of the audio sequence.

In some application scenarios, the feature information input into the cascaded classifier can be extracted by feature extraction networks of various structures.

In this case, the advanced feature extraction networks may include a timing network and/or an attention network.

The audio feature information in the audio sequence herein has a one-by-one correspondence with the occurrence time of the information nodes in the video frame sequence.

In some application scenarios, the visual feature extraction network can include Channel-Separated Convolution Networks (CSN).

In some application scenarios, the information sequence can be a video frame sequence and a secondary sequence can be an audio sequence. The audio sequence can be extracted from the raw video as the secondary sequence. The specific structure of the audio feature extraction network that processes the secondary sequence can be built based on an actual application scenario without limitation again.

As an example, the audio feature extraction network can use the short-time Fourier transform to extract frequency domain information of the audio sequence, and then use N one-dimensional convolution layers to extract timing features of the audio.

In some application scenarios, the timing network can be used to extract the timing features. The specific structure of the timing network can be built based on an actual application scenario without limitation again.

In some application scenarios, the attention network can be a neural network built based on the attention mechanism. After processing by the attention network, more important features for judgment of demarcation point judgment can be drawn in the sub-sequence.

In some embodiments, the extraction networks corresponding to the classifiers include the visual feature extraction network and the audio feature extraction network.

The output of the visual feature extraction network and the output of the audio feature extraction network herein are concentrated to obtain the basic feature information.

It should be noted that, the concentrating the feature information of video frame sequence and audio sequence can utilize the characteristic of occurrence time correspondence between audio in the audio information and video frames in the video frame sequence, refer to other types of information at the corresponding time point to assist in determining whether the target information node is a demarcation point. Therefore, the target information node can be judged as a demarcation point on the basis of multi-modality data to improve the accuracy of judgment.

In some embodiments, the advanced feature extraction network includes the visual feature extraction network and the advanced feature extraction network.

Optionally, the event advanced feature extraction network may include a timing network and/or an attention network.

In some embodiments, the corresponding advanced feature information is obtained by in case that the advanced feature extraction networks comprise a timing network and an attention network, importing the basic feature information into the timing network and importing the basic feature information into the attention network; and concatenating an output of the timing extraction network and an output of the attention extraction network as the corresponding information of event advanced features.

Similarly, the information of shot advanced features can be obtained by importing the basic feature information into the shot advanced feature extraction network. The information of scene advanced features can be obtained by importing the information of scene features into the scene advanced feature extraction network.

In some application scenarios, utilizing the advanced feature extraction networks to extract timing and/or attention features can be used as a buffer layer for feature differentiation before a classifier. On the basis of setting the advanced feature extraction networks, sharing the visual feature extraction network and the audio feature extraction network can reduce the amount of calculation while the judgment accuracy of various types of demarcation points is ensured.

In some embodiments, the timing network includes dilated convolutions.

In some application scenarios, time context information is important for detecting video event demarcations. The detections of different event demarcations require different amount of context information, and some event demarcations require a long amount of context information to be successfully detect. Using multi-layer one-dimension convolutional network with dilation can network reception field of time range. As an example, using the same convolution kernel as well as residual connections, the dilation rate of each layer of the network is twice that of the previous layer. After timing convolutions, a bidirectional long short-term memory network can be used to capture the timing features of the entire sequence. After that, the maximum activation response at each time point can be extracted with a maximum pooling.

In some embodiments, the attention network can be constructed based on multi-head attention mechanisms.

As an example, each video frame in a video sequence can be processed using N-layer self-attention layers, and the final output uses the same maximum pooling layer as the timing module to obtain maximum activation values for each time position.

It should be noted that the attention network constructed with multi-head attention mechanism can fully mine the discriminative features and attend to the difference between demarcation point image frames and non-demarcation point image frames to ensure the segmentation accuracy.

The output of the visual feature extraction network herein is taken as input to the advanced feature extraction network, and the output of the advanced feature extraction network is taken as the information of advanced features.

It should be noted that after the basic features of the sub-sequence is extracted with the visual feature extraction network, by using the advanced feature extraction network to extract at least one of the timing features and the attention features, the extracted deeper features can be used to judge whether the target information node is a demarcation point. Therefore, the establishment of the visual feature extraction network can help extract the more important features for the judgment of demarcation points and improve the accuracy of the judgment of demarcation points.

Figure 6:
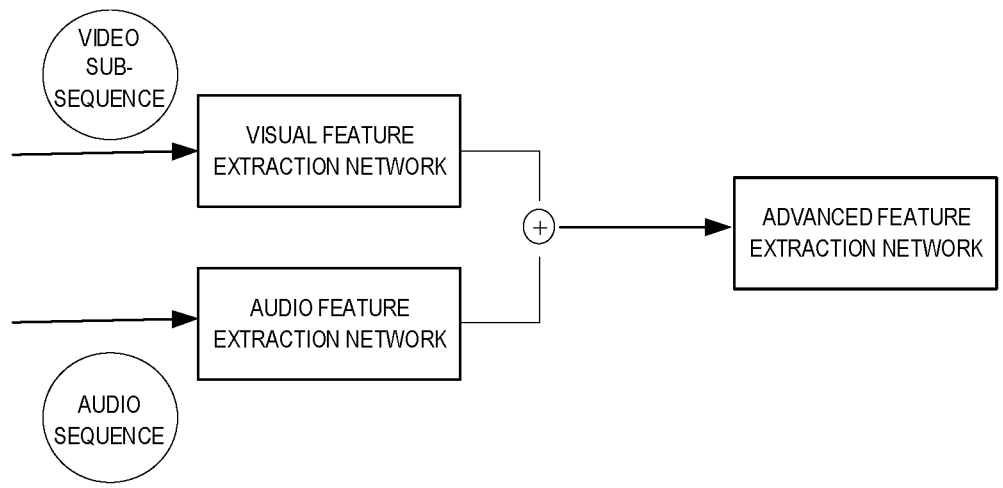
FIG. 6 is a scenario diagram of an information segmentation method according to the present disclosure.

In some embodiments, refer to FIG. 6, an output of a visual feature extraction network and an output of an audio feature extraction network are concentrated to obtain a first concentrated result.

The first concentrated result herein is used as input to an advanced feature extraction network, and an output of the advanced feature extraction network is used as node information.

It should be noted that by using the advanced feature extraction network to process secondary feature information of a secondary sequence, timing features and/or attention features in the secondary sequence can be extracted. Therefore, deeper secondary features can be used as reference information to determine whether a target information node in a sub-sequence is a demarcation point.

Figure 7:
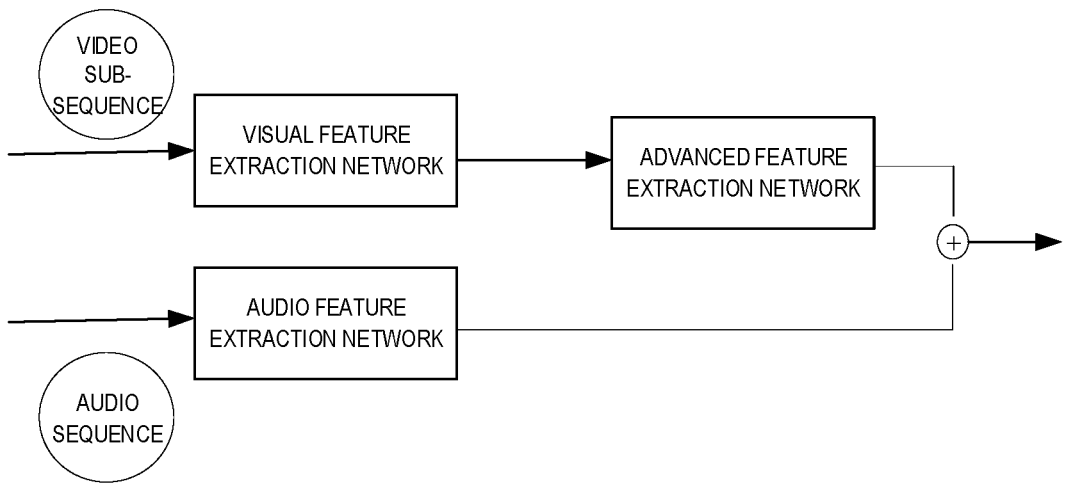
FIG. 7 is a scenario diagram of an information segmentation method according to the present disclosure.

In some embodiments, please refer to FIG. 7, an output of a visual feature extraction network is used as input to an advanced feature extraction network, and an output of the advanced feature extraction network and an output of an audio feature extraction network are concentrated to obtain a second concentrated result, which is used as node information.

As an example, secondary information can be audio features, which can be concatenated with information output by the advanced feature extraction network. Therefore, by avoiding the advanced feature extraction network to process the audio features of the secondary sequence, the information processing workload of the advanced feature extraction network can be reduced.

In some embodiments, in the case that the advanced feature extraction network includes a timing network and an attention network, an output of the timing network and an output of the attention network are concentrated as the output of the advanced feature extraction network.

By concatenating timing features and attention features as the output of the advanced feature extraction network, two types of deeper features can be combined herein to determine whether a target information node is a demarcation point.

Figure 8:
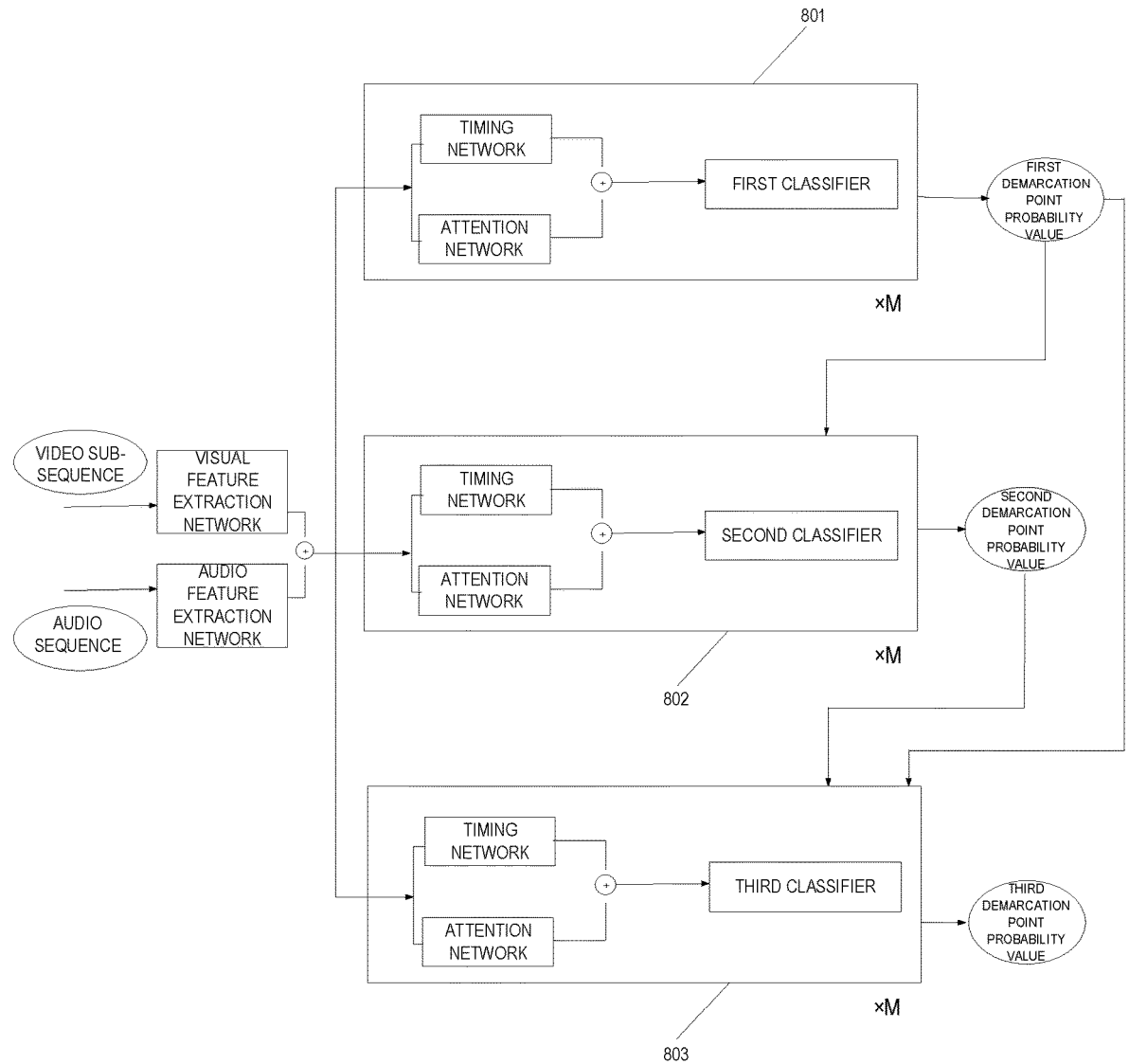
FIG. 8 is a scenario diagram of an information segmentation method according to the present disclosure.

In some embodiments, please refer to FIG. 8, which shows that a visual feature extraction network and an audio feature extraction network are shared not only by respective first classifiers corresponding to a first cascaded classifier, but also among the first cascaded classifier, a second cascaded classifier and a third cascaded classifier.

By sharing the visual feature extraction network and the audio feature extraction network, a large amount of computation can be reduced and computing resources can be saved.

In FIG. 8, advanced feature extraction networks can correspond to the classifiers one by one. A classification module 801 can include an event advanced feature extraction network and the first classifiers in the first cascaded classifier, with ×M in the lower right of the classification module 801 representing to have M classification modules 801. A classification module 802 may include an event advanced feature extraction network and second classifiers in a second cascaded classifier, with ×M in the lower right of the classification module 802 representing to have M classification modules 802. A classification module 803 may include an event advanced feature extraction network and third classifiers in a third cascaded classifier, with ×M in the lower right of the classification module 803 representing to have M classification modules 803.

Figure 9:
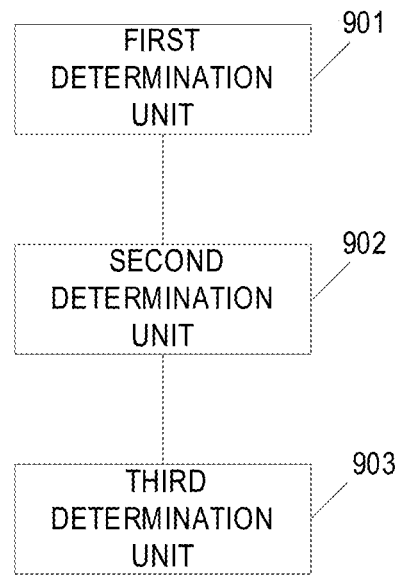
FIG. 9 is a structural diagram of an embodiment of an information processing apparatus according to the present disclosure.

With further reference to FIG. 9, as an implementation of the methods shown in each figure, the present disclosure provides an embodiment of an information processing apparatus corresponding to method embodiments shown in FIG. 1. The apparatus can be specifically applied to various electronic devices.

As shown in FIG. 9, the information processing apparatus of the present embodiment comprises a first determination unit 901, a second determination unit 902, and a third determination unit 903. Wherein, the first determination unit is used to determine, for a target information node in an information sequence and based on first node information of the target information node, a first demarcation point probability value, wherein the first demarcation point probability value indicates a probability that the target information node is a first type of demarcation point; the second determination unit is used to determine, based on the first demarcation point probability value and second node information of the target information node, a second demarcation point probability value, wherein the second demarcation point probability value indicates a probability that the information node is a second type of demarcation point; and the third determination unit is used to determine, based on the first demarcation point probability value and the second demarcation point probability value, at least two segmentation modes for the information sequence, wherein segmentation granularities of different segmentation modes are different.

In this embodiment, the specific processing of the first determination unit 901, the second determination unit 902 and the third determination unit 903 of the information processing apparatus and the technical effects brought about by them can refer to the relevant descriptions of steps 101, steps 102 and steps 103 in the corresponding embodiments in FIG. 1 respectively, which will not be repeated herein.

In some embodiments, the apparatus is further used to: obtaining third node information of the target information node; determining a third demarcation point probability value based on the third node information and at least one of the first demarcation point probability value and the second demarcation point probability value, wherein the third demarcation point probability value is used to indicate a probability that the target information node is a third type of demarcation point; and the determining, based on the first demarcation point probability value and the second demarcation point probability value, at least two segmentation modes for the information sequence further comprises: determining a segmentation mode corresponding to the third type of demarcation point.

In some embodiments, the apparatus further comprises a plurality of different segmentation modes and a plurality of corresponding demarcation point probability values, and a determination of each demarcation point probability value is related to at least one other demarcation point probability value.

In some embodiments, the information sequence comprises a video frame sequence, with the first type of demarcation point being an event demarcation point, the second type of demarcation point being a shot demarcation point, and the third type of demarcation point being a scene demarcation point.

In some embodiments, for a target information node in an information sequence and based on first node information of the target information node, the determining a first demarcation point probability value comprises: importing, into a first cascaded classifier, information of event advanced features for the target information node, wherein the first cascaded classifier comprises at least two first classifiers, wherein advanced features comprise timing features and/or attention features; and generating the first demarcation point probability value based on confidences output by respective first classifiers in the first cascaded classifier.

In some embodiments, the first classifiers in the first cascaded classifier correspond to event advanced feature extraction networks one by one; and for a target information node in an information sequence and based on first node information of the target information node, the determining a first demarcation point probability value comprises: obtaining basic feature information of the target information node, wherein the basic feature information comprises visual feature information and/or audio feature information; importing the basic feature information into each of the event advanced feature extraction networks, to obtain the information of event advanced features, wherein advanced features comprise timing features and/or attention features; inputting respective ones of the information of event advanced features into the corresponding first classifiers, to obtain confidences output by the first classifiers; and determining, based on confidences output by the respective first classifiers, the first demarcation point probability value.

In some embodiments, a second cascaded classifier comprises at least two second classifiers, with the second classifiers in the second cascaded classifier corresponding to shot advanced feature extraction networks one by one; and the determining, based on the first demarcation point probability value and second node information of the target information node, a second demarcation point probability value comprises: importing the basic feature information into each of the shot advanced feature extraction networks, to obtain respective ones of information of shot advanced features; inputting the respective ones of information of shot advanced features and the first demarcation point probability value into the corresponding second classifier, to obtain confidences output by the second classifiers; and determining, based on confidences output by the respective second classifiers, the second demarcation point probability value.

In some embodiments, a third cascaded classifier comprises at least two third classifiers, with the third classifiers in the third cascaded classifier corresponding to scene advanced feature extraction networks one by one; and the apparatus is further used to: import the basic feature information into each of the scene advanced feature extraction networks, to obtain respective ones of information of scene advanced features; input, into the corresponding third classifier, the respective ones of the information of scene advanced features and at least one of the first demarcation point probability value and the second demarcation point probability value, to obtain confidences output by the third classifiers; and determine, based on the confidences output by the respective third classifiers, the third demarcation point probability value, wherein the third demarcation point probability value indicates a probability that the target information node is the event demarcation point.

In some embodiments, training steps of a cascaded classifier comprises: obtaining sample feature information of training samples, wherein the training samples are information nodes in a sample information sequence; importing the sample feature information into a target classifier in the cascaded classifier, wherein respective classifiers in the cascaded classifier correspond to error labels one by one, and an error indicated by an error label of a classifier at a higher level than that of the target classifier is smaller than an error indicated by an error label of the target classifier; in accordance with a determination that an output result of the target classifier is true, using a classifier with a higher level than the target classifier to process the sample node information; and in accordance with a determination that the output result of the target classifier is false, masking the training sample.

In some embodiments, the apparatus is further used to obtain, from a video frame sequence, a preset number of consecutive video frames before the target information node and a preset number of consecutive video frames after the target information node, to obtain a video frame sub-sequence; and import, into a pre-trained basic feature extraction network, the video frame sub-sequence to obtain the basic feature information of the target information node.

In some embodiments, the basic feature extraction network comprises at least one of a visual feature extraction network and an audio feature extraction network; and the importing, into a pre-trained basic feature extraction network, the video frame sub-sequence to obtain the basic feature information of the target information node comprises: obtaining an audio sequence corresponding to the video frame sub-sequence; importing the video frame sub-sequence into the video feature extraction network, to obtain the visual feature information; importing the audio sequence into the audio feature extraction network, to obtain the audio feature information; and concatenating the visual feature information and the audio feature information to obtain the basic feature information.

In some embodiments, the event advanced feature extraction networks comprise a timing network and/or an attention network; and information of advanced features is obtained by: in case that the advanced feature extraction networks comprise a timing network and an attention network, importing the basic feature information into the timing network and importing the basic feature information into the attention network; and concatenating an output of the timing extraction network and an output of the attention extraction network as the corresponding information of advanced features.

In some embodiments, the timing network comprise dilated convolutions.

In some embodiments, the attention network is constructed based on a multi-head attention mechanism.

In some embodiments, the information sequence is a text information sequence.

Figure 10:
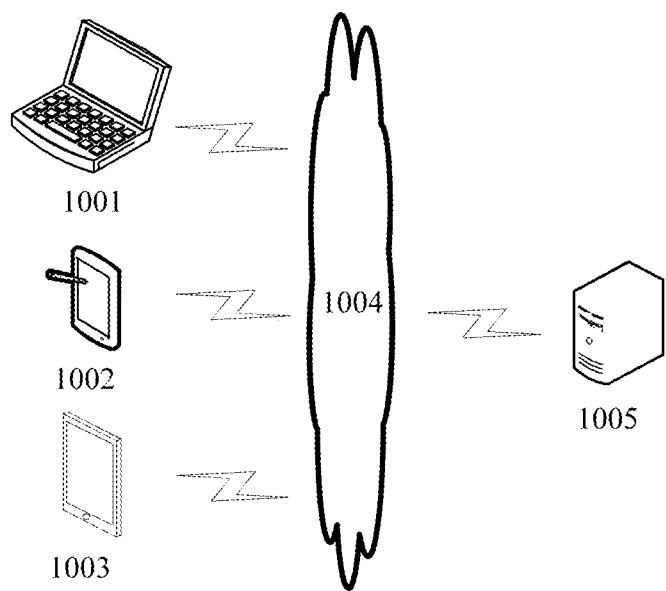
FIG. 10 is an exemplary system architecture into which an information segmentation method of an embodiment of the present disclosure can be applied.

Please refer to FIG. 10, which shows an exemplary system architecture to which an information processing method of one embodiment of the present disclosure can be applied.

As shown in FIG. 10, the system architecture may include terminal devices 1001, 1002, 1003, network 1004, and server 1005. The network 1004 is used to provide a medium of a communication link between the terminal devices 1001, 1002, 1003, and the server 1005. The network 1004 can include various types of connection, such as wired, wireless communication links, or fiber optic cables.

The terminal devices 1001, 1002, 1003 may interact with the server 1005 through the network 1004 to receive or send messages, etc. Various client applications can be installed on the terminal devices 1001, 1002, 1003, such as web browser applications, search applications, news and information applications. The client applications in the terminal devices 1001, 1002, 1003 can receive user commands and perform corresponding functions according to user commands, such as adding corresponding information to information according to the user commands.

The terminal devices 1001, 1002, 1003 can be hardware or software. When terminal devices 1001, 1002, 1003 are hardware, they can be various electronic devices with a display screen and support web browsing. Including but not limited to smart phones, tablets, e-book readers, MP3 players (Moving Picture Experts Group Audio Layer III), MP4 (Moving Picture Experts Group Audio Layer IV) players, laptop computers and desktop computers, etc. When the terminal devices 1001, 1002, 1003 are software, they can be installed in the electronic devices listed above. It can be implemented as a plurality of software or software modules (such as software or software modules used to provide distributed services), or it can be implemented as a single software or software module. No specific restrictions are made herein.

The server 1005 can be a server that provides various services, such as receiving a information acquisition request sent by the terminal devices 1001, 1002, 1003, and obtaining the display information corresponding to the information acquisition request through various methods according to the information acquisition request. And the display information related data is sent to the terminal devices 1001, 1002, 1003.

It should be noted that the information processing method provided by the embodiment of the present disclosure may be executed by the terminal devices, and correspondingly, an information processing apparatus may be set in the terminal devices 1001, 1002, 1003. In addition, the information processing method provided by the embodiment of the present disclosure may further be performed by the server 1005, and correspondingly, the information processing apparatus may be set in the server 1005.

It should be understood that the numbers of terminal devices, networks, and servers shown in FIG. 10 are only illustrative. Depending on the implementation, there can be any number of terminal devices, networks, and servers.

Figure 11:
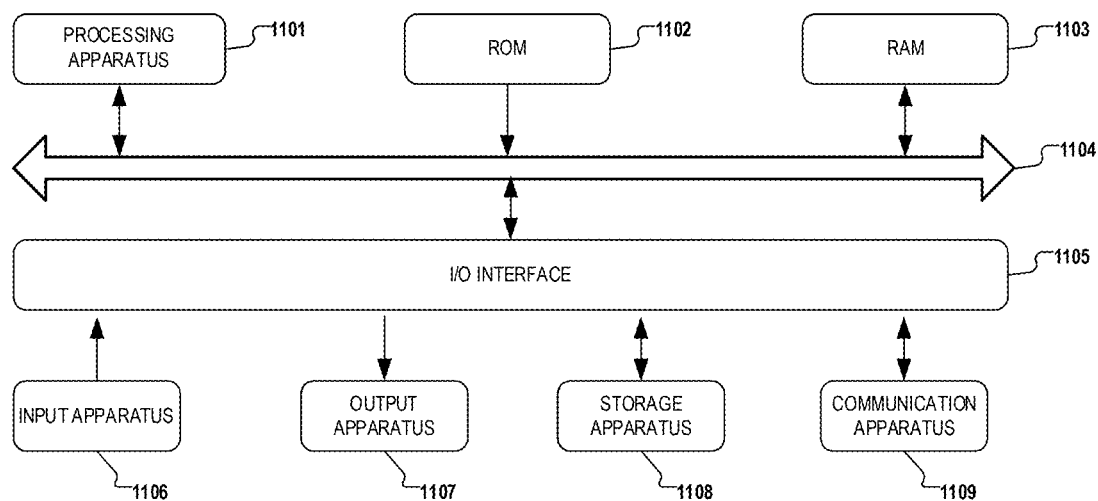
FIG. 11 is a schematic diagram of a basic structure of an electronic device provided in accordance with the embodiments of the present disclosure.

Reference is made below to FIG. 11, which shows a schematic diagram of the construction of an electronic device (e.g., a terminal device or server in FIG. 10) suitable for implementing the embodiment of the present disclosure. The terminal devices in the present disclosure may include, but are not limited to, mobile terminals such as mobile phones, laptop computers, digital broadcast receivers, PDA (personal digital assistant), PAD (tablet computer), PMP (portable multimedia player), in-vehicle terminals (e.g. in-vehicle navigation terminals), etc., and fixed terminals such as digital TV, desktop computers, etc. The electronic device shown in FIG. 11 is only an example and should not impose any limitations on the functionality and scope of use of the embodiment of the present disclosure.

As shown in FIG. 11, electronic devices may include a processing apparatus (e.g. a central processing unit, a graphics processor, etc.) 1101 that can perform various appropriate actions and processes based on programs stored in read-only memory (ROM) 1102 or loaded from storage device 1108 into random access memory (RAM) 1103. In RAM 1103, various programs and data required for the operation of the electronic device 1100 are also stored. The processing apparatus 1101, ROM 1102, and RAM 1103 are connected to each other via bus 1104. The input/output (I/O) interface 1105 is also connected to bus 1104.

In general, the following apparatuses can be connected to the I/O interface 1105; including, for example, an input apparatus 1106, such as a touch screen, a touchpad, a keyboard, a mouse, a camera, a microphones, an accelerometer, a gyroscope, etc.; including, for example, an output apparatus 1107, such as a liquid crystal display (LCD), a speaker, a vibrator, etc.; including, for example, a storage apparatus 1108, such as a magnetic tape, a hard disk, etc.; and communication apparatuses 1109. The communication apparatuses 1109 may allow the electronic devices to communicate wirelessly or wired with other devices to exchange data. Although FIG. 11 shows the electronic devices with a variety of apparatuses, it should be understood that it is not required to implement or have all of the apparatuses shown. More or fewer devices may be implemented or had instead.

In particular, according to embodiments of the present disclosure, the process described in the reference to flow chat above may be implemented as a computer software program. For example, the embodiments of the present disclosure include a computer program product that includes computer programs carried on a non-transitory computer-readable medium, which contains program code for performing methods shown in the flow chat. In such embodiments, the computer program may be downloaded and installed from the network via the communication apparatus 1109, or installed from the storage apparatus 1108, or installed from the ROM 1102. The computer programs, when executed by the processing apparatus 1101, performs the above functions defined in the methods of the embodiments of this disclosure.

It should be noted that the computer readable media mentioned in this disclosure may be a computer readable signal medium or a computer readable storage medium or any combination of the two. A computer readable storage medium, for example, may be, but is not limited to, an electrical, magnetic, optical, electromagnetic, infrared, or semiconductor system, apparatus, or device, or any combination of the above. More specific examples of computer readable storage media may include, but are not limited to: electrical connections having one or more wires, portable computer disks, hard disks, random access memory (RAM), read-only memory (ROM), erasable programmable read only memory (EPROM or flash memory), optical fibers, portable compact disk Read only memory (CD-ROM), optical storage devices, magnetic storage devices, or any suitable combination of the above. In this disclosure, a computer-readable storage medium may be any tangible medium that contains or stores programs that may be used by or in combination with an instruction execution system, apparatus, or device. In the present disclosure, however, a computer-readable signal medium may include a data signal propagated in a baseband or as part of a carrier, which carries computer-readable program code. Such propagated data signal may take various forms, including but not limited to electromagnetic signals, optical signals, or any suitable combination of the above. A computer-readable signal medium may also be any computer-readable medium other than a computer-readable storage medium that may send, propagate or transmit programs intended for use by or in combination with an instruction executing system, apparatus or device. The program code contained on the computer readable medium may be transmitted in any appropriate medium, including but not limited to electrical wire, optical cable, RF (radio frequency), etc., or any suitable combination of the above.

In some embodiments, a client or a server may communicate using any currently known or future developed network Protocol, such as HTTP (HyperText Transfer Protocol), and may interconnect with digital data communication in any form or medium (e.g., communication network). Examples of the communication networks include local area networks ("Lans"), wide area networks ("Wans"), internets (e.g., the Internet), and end-to-end networks (e.g., ad hoc end-to-end networks), as well as any currently known or future developed networks.

The above-mentioned computer readable medium may be included in the above-mentioned electronic device; or it may stand alone and not be incorporated into that electronic device.

The computer readable medium carries one or more programs which, when executed by that electronic device, cause that electronic device to; for a target information node in an information sequence and based on first node information of the target information node, determine a first demarcation point probability value, wherein the first demarcation point probability value indicates a probability that the target information node is a first type of demarcation point; determine, based on the first demarcation point probability value and second node information of the target information node, a second demarcation point probability value, wherein the second demarcation point probability value indicates a probability that the information node is a second type of demarcation point; and determine, based on the first demarcation point probability value and the second demarcation point probability value, at least two segmentation modes for the information sequence, wherein segmentation granularities of different segmentation modes are different.

In some embodiments, the electronic device is further used to; obtain third node information of the target information node; determine a third demarcation point probability value based on the third node information and at least one of the first demarcation point probability value and the second demarcation point probability value, wherein the third demarcation point probability value is used to indicate a probability that the target information node is a third type of demarcation point; and the determining, based on the first demarcation point probability value and the second demarcation point probability value, at least two segmentation modes for the information sequence further comprises; determining a segmentation mode corresponding to the third type of demarcation point.

In some embodiments, a plurality of different segmentation modes and a plurality of corresponding demarcation point probability values are further comprised, and a determination of each demarcation point probability value is related to at least one other demarcation point probability value.

In some embodiments, the information sequence comprises a video frame sequence, with the first type of demarcation point being an event demarcation point, the second type of demarcation point being a shot demarcation point, and the third type of demarcation point being a scene demarcation point.

In some embodiments, for a target information node in an information sequence and based on first node information of the target information node, the determining a first demarcation point probability value comprises: importing, into a first cascaded classifier, information of event advanced features for the target information node, wherein the first cascaded classifier comprises at least two first classifiers, wherein advanced features comprise timing features and/or attention features; and generating the first demarcation point probability value based on confidences output by respective first classifiers in the first cascaded classifier.

In some embodiments, the first classifiers in the first cascaded classifier correspond to event advanced feature extraction networks one by one; and for a target information node in an information sequence and based on first node information of the target information node, the determining a first demarcation point probability value comprises: obtaining basic feature information of the target information node, wherein the basic feature information comprises visual feature information and/or audio feature information; importing the basic feature information into each of the event advanced feature extraction networks, to obtain the information of event advanced features, wherein advanced features comprise timing features and/or attention features; inputting respective ones of the information of event advanced features into the corresponding first classifiers, to obtain confidences output by the first classifiers; and determining, based on confidences output by the respective first classifiers, the first demarcation point probability value.

In some embodiments, a second cascaded classifier comprises at least two second classifiers, with the second classifiers in the second cascaded classifier corresponding to shot advanced feature extraction networks one by one; and the determining, based on the first demarcation point probability value and second node information of the target information node, a second demarcation point probability value comprises: importing the basic feature information into each of the shot advanced feature extraction networks, to obtain respective ones of information of shot advanced features; inputting the respective ones of information of shot advanced features and the first demarcation point probability value into the corresponding second classifier, to obtain confidences output by the second classifiers; and determining, based on confidences output by the respective second classifiers, the second demarcation point probability value.

In some embodiments, a third cascaded classifier comprises at least two third classifiers, with the third classifiers in the third cascaded classifier corresponding to scene advanced feature extraction networks one by one; and the electronic device is further used to; import the basic feature information into each of the scene advanced feature extraction networks, to obtain respective ones of information of scene advanced features; input, into the corresponding third classifier, the respective ones of the information of scene advanced features and at least one of the first demarcation point probability value and the second demarcation point probability value, to obtain confidences output by the third classifiers; and determine, based on the confidences output by the respective third classifiers, the third demarcation point probability value, wherein the third demarcation point probability value indicates a probability that the target information node is the event demarcation point.

In some embodiments, training steps of a cascaded classifier comprises: obtaining sample feature information of training samples, wherein the training samples are information nodes in a sample information sequence; importing the sample feature information into a target classifier in the cascaded classifier, wherein respective classifiers in the cascaded classifier correspond to error labels one by one, and an error indicated by an error label of a classifier at a higher level than that of the target classifier is smaller than an error indicated by an error label of the target classifier; in accordance with a determination that an output result of the target classifier is true, using a classifier with a higher level than the target classifier to process the sample node information; and in accordance with a determination that the output result of the target classifier is false, masking the training sample.

In some embodiments, the electronic device is further used to obtaining, from a video frame sequence, a preset number of consecutive video frames before the target information node and a preset number of consecutive video frames after the target information node, to obtain a video frame sub-sequence; and import, into a pre-trained basic feature extraction network, the video frame sub-sequence to obtain the basic feature information of the target information node.

In some embodiments, the basic feature extraction network comprises at least one of a visual feature extraction network and an audio feature extraction network; and the importing, into a pre-trained basic feature extraction network, the video frame sub-sequence to obtain the basic feature information of the target information node comprises: obtaining an audio sequence corresponding to the video frame sub-sequence; importing the video frame sub-sequence into the video feature extraction network, to obtain the visual feature information; importing the audio sequence into the audio feature extraction network, to obtain the audio feature information; and concatenating the visual feature information and the audio feature information to obtain the basic feature information.

In some embodiments, the advanced feature extraction networks comprise a timing network and/or an attention network; and corresponding information of advanced features is obtained by; in case that the advanced feature extraction networks comprise a timing network and an attention network, importing the basic feature information into the timing network and importing the basic feature information into the attention network; and concatenating an output of the timing extraction network and an output of the attention extraction network as the corresponding information of advanced features.

In some embodiments, the timing network comprise dilated convolutions.

In some embodiments, the attention network is constructed based on a multi-head attention mechanism.

In some embodiments, the information sequence is a text information sequence.

Computer program code for performing the operations of the present disclosure may be written in one or more programming languages, or combinations thereof, which comprise, but not limited to, object-oriented programming languages, such as Java, Smalltalk, C++; and conventional procedural programming languages, such as the "C" language or similar programming languages. The program code may be executed entirely on the user's computer, partly on the user's computer, as a stand-alone package, partly on the user's computer and partly on a remote computer, or entirely on a remote computer or server. In the situation involving a remote computer, the remote computer may be connected to the user computer via any kind of network, including a local area network (LAN) or a wide area network (WAN), or it may be connected to an external computer (e.g., using an Internet service provider to connect via the Internet).

Flow charts and block diagrams in the attached drawings illustrate of the architecture, functions, and operations of the possible implementation of the systems, methods, and computer program products in accordance with various embodiments of the present disclosure. In this regard, each box in the flow chats or block diagrams may represent a module, program segment, or part of code that contains one or more executable instructions for implementing a specified logical function. It should also be noted that in some alternate implementations, the functions indicated in the boxes may also occur in a different order than those indicated in the attached drawings. For example, two boxes represented one after another can actually be executed in parallel, or they can sometimes be executed in reverse order, depending on the function involved. Note also that each of the boxes in the block diagrams and/or the flow charts, and the combination of the boxes in the block diagrams and/or the flow charts, can be implemented with a dedicated hardware-based system that performs the specified function or operation, or with a combination of dedicated hardware and computer instructions.

The involved units described in the embodiments of the present disclosure may be implemented either by means of software or by means of hardware. The names of the units herein does not constitute a qualification for the unit itself in a certain situation, for example, the first determination unit may also be described as "the unit that determines the first demarcation point probability value".

The functions described above herein can be performed, at least in part, by one or more hardware logic components. For example, non-restrictively, exemplary types of hardware logic components that can be used include: field programmable gate arrays (FPGAs), application-specific integrated circuits (ASICs), application-specific standard products (ASSPs), system-on-chip (SOCs), complex programmable logic devices (CPLDs), and so on.

In the context of this disclosure, a machine-readable medium may be a tangible medium that may contain or store a program for use by or in conjunction with an instruction executing system, apparatus, or device. The machine-readable medium may be a machine-readable signal medium or a machine-readable storage medium. The machine-readable media may include, but are not limited to, electronic, magnetic, optical, electromagnetic, infrared, or semiconductor systems, apparatuses, or devices, or any suitable combination of the above. More specific examples of the machine-readable storage medium would include electrical connections based on one or more wires, portable computer disks, hard disks, random access memory (RAM), read-only memory (ROM), erasable programmable read-only memory (EPROM or flash memory), optical fibers, portable compact disk read-only memory (CD-ROM), optical storage devices, magnetic storage devices, or any suitable combination of the above.

The above description is only a better embodiment of the present disclosure and an explanation of the technical principles to be applied. It should be understood by those skilled in the art that the scope of disclosure involved in this disclosure is not limited to technical solutions resulting from a particular combination of the aforesaid technical features, but also covers other technical solutions resulting from any combination of the aforesaid technical features or their equivalents without being separated from the aforesaid disclosed ideas, for example, the technical solutions formed by the substitution of the above features with the technical features with similar functions as (but not limited to) disclosed in this disclosure.

In addition, although operations are described in a particular order, this should not be construed as requiring that those operations be performed in the particular order shown or in a sequential order. In certain circumstances, multitasking and parallel processing may be advantageous. Again, although certain implementation details are included in the above discussion, these should not be interpreted as limiting the scope of this disclosure. Certain features described in the context of individual embodiments may also be realized in combination in a single embodiment. Conversely, various features described in the context of a single embodiment may also be realized individually or in any suitable subcombination.

Although the subject matter has been described in language specific to structural features and/or method logical actions, it should be understood that the subject matter defined in the attached claims is not necessarily limited to the specific features or actions described above. Rather, the specific features and actions described above are merely exemplary forms to implement the claims.

We claim:

1. A method for information segmentation, characterized in that the method comprises:
   for a target information node in an information sequence and based on first node information of the target information node, determining a first demarcation point probability value, wherein the first demarcation point probability value indicates a probability that the target information node is a first type of demarcation point;
   determining, based on the first demarcation point probability value and second node information of the target information node, a second demarcation point probability value, wherein the second demarcation point probability value indicates a probability that the target information node is a second type of demarcation point; and
   determining, based on the first demarcation point probability value and the second demarcation point probability value, at least two segmentation modes for the information sequence, wherein segmentation granularities of different segmentation modes are different,
   wherein determining the first demarcation point probability value comprises:
   importing, into a first cascaded classifier, information of event advanced features for the target information node, wherein the first cascaded classifier comprises at least two first classifiers, wherein advanced features comprise timing features and/or attention features; and
   generating the first demarcation point probability value based on confidences output by respective first classifiers in the first cascaded classifier.

2. The method of claim 1, characterized in that the method further comprises:
   obtaining third node information of the target information node;
   determining a third demarcation point probability value based on the third node information and at least one of the first demarcation point probability value and the second demarcation point probability value, wherein the third demarcation point probability value is used to indicate a probability that the target information node is a third type of demarcation point; and
   the determining, based on the first demarcation point probability value and the second demarcation point probability value, the at least two segmentation modes for the information sequence further comprises:
   determining a segmentation mode corresponding to the third type of demarcation point.

3. The method of claim 1, characterized in further comprising a plurality of different segmentation modes and a plurality of corresponding demarcation point probability values, a determination of each demarcation point probability value is related to at least one other demarcation point probability value.

4. The method of claim 2, characterized in that, the information sequence comprises a video frame sequence, with the first type of demarcation point being an event demarcation point, the second type of demarcation point being a shot demarcation point, and the third type of demarcation point being a scene demarcation point.

5. The method of claim 1, characterized in that, the respective first classifiers in the first cascaded classifier correspond to event advanced feature extraction networks one by one; and
   for the target information node in the information sequence and based on the first node information of the target information node, the determining the first demarcation point probability value comprises:
   obtaining basic feature information of the target information node, wherein the basic feature information comprises visual feature information and/or audio feature information;
   importing the basic feature information into each of the event advanced feature extraction networks, to obtain the information of the event advanced features, wherein the event advanced features comprise the timing features and/or the attention features;
   inputting respective ones of the information of the event advanced features into the corresponding first classifiers, to obtain confidences output by the first classifiers; and
   determining, based on confidences output by the respective first classifiers, the first demarcation point probability value.

6. The method of claim 5, characterized in that, a second cascaded classifier comprises at least two second classifiers, with the at least two second classifiers in the second cascaded classifier corresponding to shot advanced feature extraction networks one by one; and
   the determining, based on the first demarcation point probability value and the second node information of the target information node, the second demarcation point probability value comprises:
   importing the basic feature information into each of the shot advanced feature extraction networks, to obtain respective ones of information of shot advanced features;
   inputting the respective ones of information of the shot advanced features and the first demarcation point probability value into the corresponding second classifier, to obtain confidences output by the second classifiers; and
   determining, based on confidences output by the respective second classifiers, the second demarcation point probability value.

7. The method of claim 6, characterized in that, a third cascaded classifier comprises at least two third classifiers, with the at least two third classifiers in the third cascaded classifier corresponding to scene advanced feature extraction networks one by one; and the method further comprises:

importing the basic feature information into each of the scene advanced feature extraction networks, to obtain respective ones of information of scene advanced features;

inputting, into the corresponding third classifier, the respective ones of the information of scene advanced features and at least one of the first demarcation point probability value and the second demarcation point probability value, to obtain confidences output by the third classifiers; and determining, based on the confidences output by the respective third classifiers, the third demarcation point probability value, wherein the third demarcation point probability value indicates a probability that the target information node is the event demarcation point.

8. The method of claim 1, characterized in that, training steps of a cascaded classifier comprises:

obtaining sample feature information of training samples, wherein the training samples are information nodes in a sample information sequence;

importing the sample feature information into a target classifier in the cascaded classifier, wherein respective classifiers in the cascaded classifier correspond to error labels one by one, and an error indicated by an error label of a classifier at a higher level than that of the target classifier is smaller than an error indicated by an error label of the target classifier;

in accordance with a determination that an output result of the target classifier is true, using a classifier with a higher level than the target classifier to process the sample node information; and in accordance with a determination that the output result of the target classifier is false, masking the training sample.

9. The method of claim 5, characterized in that, the method further comprises:

obtaining, from a video frame sequence, a preset number of consecutive video frames before the target information node and a preset number of consecutive video frames after the target information node, to obtain a video frame sub-sequence; and importing, into a pre-trained basic feature extraction network, the video frame sub-sequence to obtain the basic feature information of the target information node.

10. The method of claim 9, characterized in that, the pre-trained basic feature extraction network comprises at least one of a visual feature extraction network and an audio feature extraction network; and the importing, into a pre-trained basic feature extraction network, the video frame sub-sequence to obtain the basic feature information of the target information node comprises:

obtaining an audio sequence corresponding to the video frame sub-sequence;

importing the video frame sub-sequence into the video feature extraction network, to obtain the visual feature information;

importing the audio sequence into the audio feature extraction network, to obtain the audio feature information; and concatenating the visual feature information and the audio feature information to obtain the basic feature information.

11. The method of claim 5, characterized in that, advanced feature extraction networks comprise a timing network and/or an attention network; and corresponding information of advanced features is obtained by:

in case that the advanced feature extraction networks comprise a timing network and an attention network, importing the basic feature information into the timing network and importing the basic feature information into the attention network; and concatenating an output of the timing extraction network and an output of the attention extraction network as the corresponding information of advanced features.

12. The method of claim 11, characterized in that, the timing network comprise dilated convolutions.

13. The method of claim 11, characterized in that, the attention network is constructed based on a multi-head attention mechanism.

14. The method of claim 1, characterized in that, the information sequence is a text information sequence.

15. An electronic device, characterized in that, comprising:

one or more processors; and a storage apparatus for storing one or more programs which when executed by the one or more processors, causing the one or more processors to perform acts comprising:

for a target information node in an information sequence and based on first node information of the target information node, determining a first demarcation point probability value, wherein the first demarcation point probability value indicates a probability that the target information node is a first type of demarcation point;

determining, based on the first demarcation point probability value and second node information of the target information node, a second demarcation point probability value, wherein the second demarcation point probability value indicates a probability that the information node is a second type of demarcation point; and determining, based on the first demarcation point probability value and the second demarcation point probability value, at least two segmentation modes for the information sequence, wherein segmentation granularities of different segmentation modes are different, wherein determining the first demarcation point probability value comprises:

importing, into a first cascaded classifier, information of event advanced features for the target information node, wherein the first cascaded classifier comprises at least two first classifiers, wherein advanced features comprise timing features and/or attention features; and generating the first demarcation point probability value based on confidences output by respective first classifiers in the first cascaded classifier.

16. The electronic device of claim 15, characterized in that the acts further comprises:

obtaining third node information of the target information node;

determining a third demarcation point probability value based on the third node information and at least one of the first demarcation point probability value and the second demarcation point probability value, wherein the third demarcation point probability value is used to indicate a probability that the target information node is a third type of demarcation point; and the determining, based on the first demarcation point probability value and the second demarcation point probability value, at least two segmentation modes for the information sequence further comprises:
  determining a segmentation mode corresponding to the third type of demarcation point.

17. The electronic device of claim 15, characterized in further comprising a plurality of different segmentation modes and a plurality of corresponding demarcation point probability values, a determination of each demarcation point probability value is related to at least one other demarcation point probability value.

18. The electronic device of claim 16, characterized in that, the information sequence comprises a video frame sequence, with the first type of demarcation point being an event demarcation point, the second type of demarcation point being a shot demarcation point, and the third type of demarcation point being a scene demarcation point.

19. A non-transitory computer-readable medium having computer programs stored thereon, characterized in that, the programs, when executed by processors, performs acts comprising:
  for a target information node in an information sequence and based on first node information of the target information node, determining a first demarcation point probability value, wherein the first demarcation point probability value indicates a probability that the target information node is a first type of demarcation point;
  determining, based on the first demarcation point probability value and second node information of the target information node, a second demarcation point probability value, wherein the second demarcation point probability value indicates a probability that the information node is a second type of demarcation point; and
  determining, based on the first demarcation point probability value and the second demarcation point probability value, at least two segmentation modes for the information sequence, wherein segmentation granularities of different segmentation modes are different,
  wherein determining the first demarcation point probability value comprises:
  importing, into a first cascaded classifier, information of event advanced features for the target information node, wherein the first cascaded classifier comprises at least two first classifiers, wherein advanced features comprise timing features and/or attention features; and
  generating the first demarcation point probability value based on confidences output by respective first classifiers in the first cascaded classifier.

* * * * *